(12) United States Patent  
Schwarzwald

(10) Patent No.: US 7,658,982 B2
(45) Date of Patent: Feb. 9, 2010

(54) MEMBRANE APPARATUS FOR RECEIVING SAMPLES

(75) Inventor: Detlef Schwarzwald, Hamburg (DE)

(73) Assignee: Eppendorf AG, Hamburg (DE)

( * ) Notice: Subject to any disclaimer, the term of this patent is extended or adjusted under 35 U.S.C. 154(b) by 543 days.

(21) Appl. No.: 10/225,881

(22) Filed: Aug. 21, 2002

(65) Prior Publication Data

US 2003/0038076 A1    Feb. 27, 2003

(30) Foreign Application Priority Data

Aug. 27, 2001   (DE) ................ 101 41 817

(51) Int. Cl.
  *B32B 1/02* (2006.01)
  *B32B 1/08* (2006.01)
  *B32B 5/04* (2006.01)
(52) U.S. Cl. .................. 428/34.1; 428/34.4; 428/34.5; 428/35.7; 428/35.9; 428/36.9
(58) Field of Classification Search ............... 428/34.1, 428/34.4, 34.5, 35.7, 35.9, 36.9
See application file for complete search history.

(56) References Cited

U.S. PATENT DOCUMENTS

| 3,806,386 | A |   | 4/1974  | Burke et al. ............... 156/73 |
| 3,954,625 | A |   | 5/1976  | Michalski ................ 210/445 |
| 4,148,732 | A |   | 4/1979  | Burrow et al. ............. 210/332 |
| 4,683,058 | A |   | 7/1987  | Lyman et al. .............. 210/359 |
| 5,792,354 | A | * | 8/1998  | Aksberg .................. 210/406 |
| 6,161,927 | A | * | 12/2000 | Long et al. ................ 347/86 |
| 6,225,130 | B1 | * | 5/2001 | Kitajima et al. ............ 436/177 |
| 6,550,901 | B2 | * | 4/2003 | Iida ...................... 347/86 |

FOREIGN PATENT DOCUMENTS

| DE | 8435227 | 2/1985 |
| DE | 9228386 | 5/1993 |
| DE | 4427113 | 2/1996 |
| DE | 9823363 | 7/1999 |
| EP | 0503128 | 9/1992 |
| WO | 9317090 | 9/1993 |

* cited by examiner

*Primary Examiner*—Marc A Patterson
(74) *Attorney, Agent, or Firm*—Abelman, Frayne & Schwab

(57) ABSTRACT

An apparatus for receiving samples, comprising at least one vessel having at least one aperture and a membrane covering the aperture which is held at the border side between a step and a deformed area of the vessel.

14 Claims, 2 Drawing Sheets

MEMBRANE APPARATUS FOR RECEIVING SAMPLES

BACKGROUND OF THE INVENTION

1. Field of the Invention

The invention relates to an apparatus which has at least one vessel including at least one membrane for receiving samples.

2. Description of the Prior Art

Apparatus of this type are known, especially for use at laboratories. For instance, those are centrifugal filtration vessels in the form of a small tube with a filtering membrane which closes a bottom-sided aperture. The centrifugal filter cartridge is inserted in the upper region of a centrifuging vessel and is supported by an outer step thereof at the border of the filling aperture of the centrifuging vessel. A sample liquid poured into the centrifugal filtration vessel is filtered by the membrane during centrifuging. The filtered liquid passes into the centrifuging vessel through the membrane and the aperture and the filtration residue is retained by the membrane. It is known to loosely place the membrane on top of a perforated bottom of the filtration vessel U.S. Pat. No. 4,683, 058). As a consequence, the liquid might flow past the membrane, particularly if the membrane slips away so as not to cause the filtering action which is desired.

In addition, it is known to fuse membranes, at their borders, to the bottom area of vessels. However, this presupposes that the material of the membrane and that of the vessel, which is mostly a plastic material, can be welded to each other. Furthermore, if different membrane thicknesses are used it is necessary to adapt the manufacturing process to them, which is relatively expensive.

Moreover, membrane panels are known which are panels made of a plastic including a multiplicity of receptacles which have an aperture at top and the bottom of which is closed by a membrane. The filtration of liquid samples using membrane panels, for instance, may be accomplished by suction devices which apply a negative pressure to the membrane side of the membrane panel to allow the filtrate to drip into a receiver arranged below the membrane panel. If membrane panels are used the membranes are inserted or welded in or are welded to the panel underside like in centrifugal filtration vessels.

Accordingly, it is the object of the invention to provide an apparatus for receiving samples which prevents the medium to be filtered from flowing past the membrane and enables the use of membranes made of different materials and exhibiting different dimensions. In addition, the intention is to provide a method for the manufacture of the apparatus.

SUMMARY OF THE INVENTION

The object of the invention is achieved by an apparatus having at least one vessel which has at least one aperture, and a membrane covering the aperture which is held at the border side between a step and a deformed area of the vessel.

The membrane is adapted to be mounted by simply placing it on the step and producing the deformation. Mounting is done by a positive fit or non-positive fit and does not substantially depend on the membrane material and dimensions. Moreover, fixing the membrane between the step and the deformed area may cause it to be sealed to the border.

The invention incorporates impermeable membranes or sheetings. It particularly relates to membranes which exhibit different permeabilities to different substances and/or are capable of adding certain substances. The membrane may be located at an upper aperture of the vessel (e.g. as a destructible closure) and/or at a lower one (e.g. as a filtering membrane).

According to an aspect, the membrane is circular. According to an aspect, the step and/or the deformed area extends/extend around the membrane, which specifically allows to fix the membrane more uniformly and to seal it more reliably.

According to an aspect, the step is disposed at the outside of the membrane and the deformed area is disposed at the inside of the membrane with the inside of the membrane associated with the inside of the vessel. According to another aspect, the step forms part of a bottom of the vessel and has one or more apertures. According to another aspect, the bottom is completely grate-like or is grate-like in a central region.

According to an aspect, the deformed area is manufactured from another step of the vessel which adjoins the step and the height of which exceeds the wall thickness of the membrane. This makes it possible to mount membranes having larger wall thicknesses in a vessel of the same type in the same manner. The extent to which the further step is deformed may be adapted to the wall thickness of the membrane. As a principle, however, it is also possible to fix membranes of different wall thicknesses while leaving unchanged the deformation of the further step if a different compression of the external membrane areas is not detrimental. Generally, the step may be defined by a further deformed area. However, it is preferred that it be formed already when the vessel is given its original shape, which can be done by injection molding, for instance, if the vessel is a plastic vessel.

In particular, the membrane may be a fibre glass membrane, plastic membrane (e.g. a polyamide membrane or polysulfone membrane), a metallic lattice membrane, ceramic membrane or cellulose membrane.

According to an aspect, the membrane is a multilayered membrane. The membrane mounting favors the use of such "sandwich membranes" the layers of which may exhibit different filtration effects because it favors the mounting of membranes of different membrane thicknesses.

According to an aspect, the vessel is made of a plastic material. Any plastic materials may be considered usable as far as they exhibit some deformability, which generally incorporates deformability with the material structure undergoing destruction.

According to a further aspect, the vessel is made of a thermoplastic material (e.g. polypropylene). In particular, a thermoplastic material can be deformed by the action of heat.

According to an aspect, the deformation is a mechanical and/or thermal deformation. It is specifically in a thermoplastic material that the deformed are may be produced by thermal deformation or a combination of mechanical and thermal deformations. As a principle, a purely mechanical deformation may also be accomplished, e.g. by pressing, thread-cutting, etc. A flowable plastic (e.g. polytetrafluoroethylene) is also deformable mechanically without causing any destruction of the material structure.

According to another aspect, the deformation is a deformation caused by ultra-sonic sound. Such a deformation may be produced by means of a device as is otherwise employed in ultrasonic welding. Ultrasonic welding welds two plastic components together. Energy is supplied by ultrasonic vibrations perpendicular to the surface which heat the material to the softening point and join the two components by partially fusing them onto each other. The ultrasonic vibrations are introduced into the material by means of a so-called "sonotrode". The welding procedure is limited to using appropriate matches of material. In contrast, the ultrasonic process is employed, within the scope of the invention, to deform the vessel material which is a thermally deformable material.

According to another aspect, the deformation is a deformation caused by frictional heat.

According to an aspect, the apparatus is a centrifugal filtration vessel, bacterial culture vessel, dialytical vessel or a membrane panel.

The vessel, according to an aspect, is cylindrical and has a filling aperture opposite at least one aperture in the bottom. The vessel, according to an aspect, has a collar at its outside which may serve as a support at the border of the centrifugal vessel if it is a centrifugal filtration vessel.

According to an aspect, the vessel has a receptacle for a closing lid on a filling aperture. In particular, the receptacle may be a press-fit receptacle.

In a method suited for the manufacture of the inventive apparatus, a membrane is placed on a step at the border of an aperture of a vessel and a further step projecting beyond the membrane is deformed so that the membrane is held between the step and a deformed area.

According to a further aspect, the further step is deformed by means of a cylindrical tool having a central indentation which prevents the membrane from being deformed in the central region According to an aspect, the further step is deformed by ultrasonic sound. The cylindrical tool in question may specifically be a sonotrode to introduce the ultra-sonic sound.

According to an aspect, the further step is deformed by pressing and/or hot pressing and/or frictional heat. In this manner, deformation can generally be performed also by means of a cylindrical tool, e.g. by means of a friction tool, a heated tool or by means of a rotary tool.

BRIEF DESCRIPTION OF THE DRAWINGS

The invention will be described below with reference to the accompanying drawings of an embodiment. In the drawings.

DETAILED DESCRIPTION OF THE PREFERRED EMBODIMENTS

Figure 1:
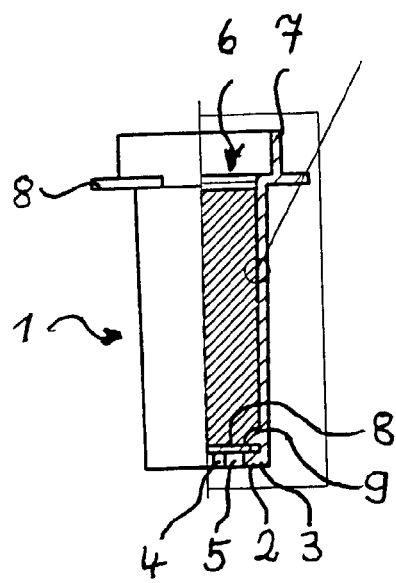
FIG. 1 shows a centrifugal filtration vessel in a partial vertical section.
Figure 2:
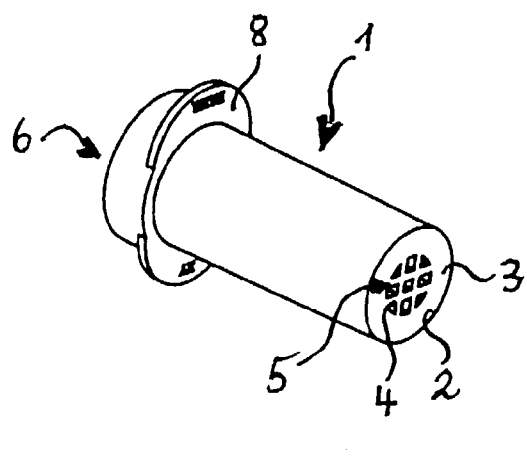
FIG. 2 shows the same centrifugal filtration vessel in a perspective side view from bottom.
Figure 3:
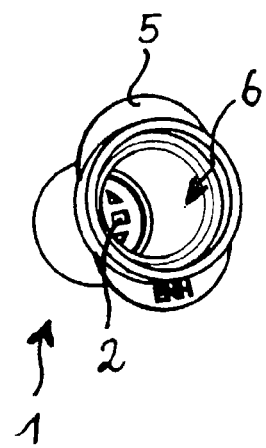
FIG. 3 shows the same centrifugal filtration vessel in a perspective side view from top.

The centrifugal filtration vessel of FIGS. 1 through 3 is a cylindrical vessel 1 which has a bottom 2 which exhibits a border-sided step 3 and a grate-like structure 4 having apertures 5 in the centre.

Vessel 1 has a filling aperture 6 at the other end. Adjacent to the filling aperture 6 is an extension 7 which defines a receptacle for a stopper-like closure. Vessel 1 has an elliptical collar 8 at the outside at the level of filling aperture 6.

A circular membrane 8 made of a filtering material is arranged on bottom 2. This membrane is held at the border side between the circumferential step of bottom 2 and a deformed area 9 of the wall of vessel 1.

Figure 4:
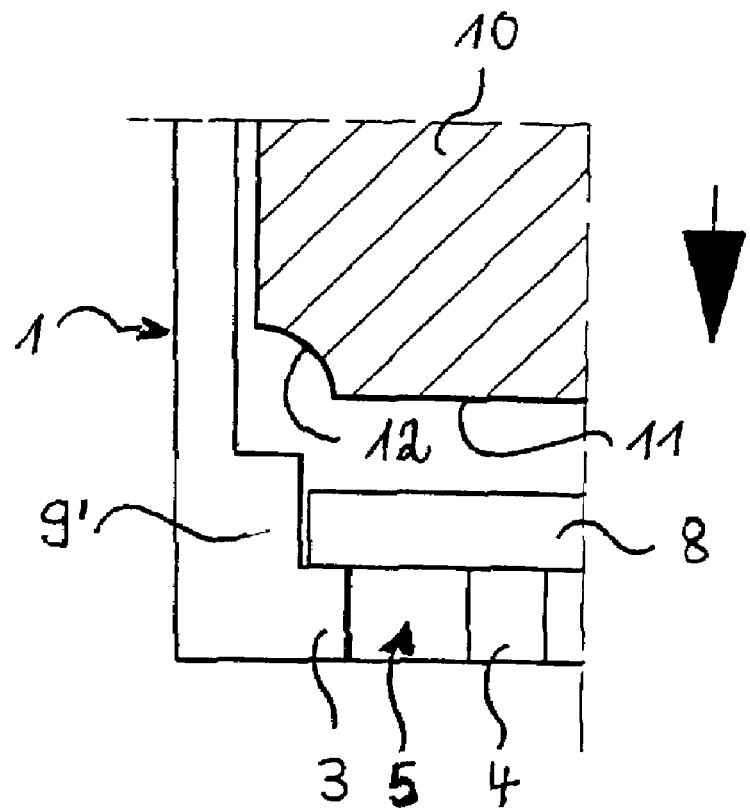
FIG. 4 shows the bottom region of the same centrifugal filtration vessel prior to deformation in an enlarged half-section.
Figure 5:
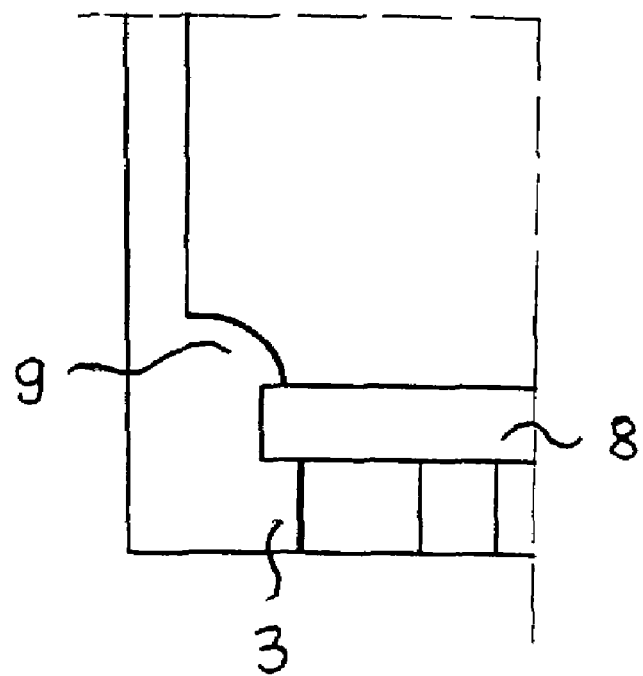
FIG. 5 shows the same bottom region subsequent to deformation in an enlarged half-section.

According to FIGS. 4 and 5, deformed area 9 has arisen from a further step 9' which axially projects beyond step 3 in vessel 1 and the height of which exceeds the thickness of the membrane. A stamp 10 which is substantially cylindrical and includes a sonotrode and which has a circumferential fillet 12 at the border of its front side 11 is moved into vessel 1 in the direction of the arrow in FIG. 4. Stamp 10 is excited by an ultrasonic vibration. As a result, when fillet 12 comes to be placed on further step 9' an intensified flow of energy is caused in this further step 9' and causes the further step 9' to be heated so as to undergo deformation as is shown in FIG. 5. The outer contour of deformed area 9 matches the inner contour of fillet 12. This fixes membrane 8 between deformed area 9 and step 3 in a positive fit although a non-positive fit may be achieved by compressing membrane 8 to a certain extent.

A vessel 1 made of a thermoplastic material is beneficial for deformation. The material of membrane 8 may generally be any material and membranes 8 of different wall thicknesses may also be fixed in vessel 1 in the way described.

Figure 6:
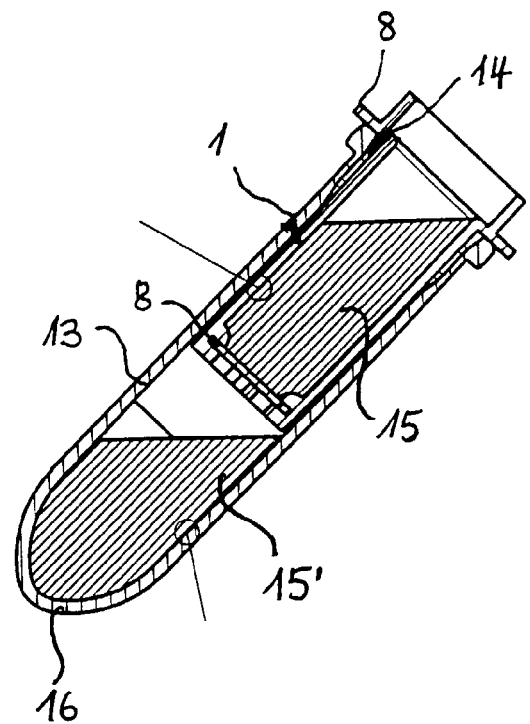
FIG. 6 shows the same centrifugal filtration vessel inserted in a small centrifuging tube in a vertical section.

FIG. 6 shows centrifugal filtration vessel 1 inserted in a centrifuging vessel 13.

This assembly is centrifuged with a liquid sample 15 filled into centrifugal filtration vessel 1 in the oblique position illustrated. The filtrate 15' gathers below membrane 8 above the bottom 16 of centrifuging vessel 13. The filtration residues remain above membrane 8.

What is claimed is:

1. An apparatus for receiving samples, comprising a vessel having a wall defining an inner space for receiving a sample, a bottom having at least one aperture communicating with the inner space, and a step formed at the bottom, the wall of the vessel having a deformed area spaced from the step and formed as a mechanical and/or thermal deformation; and a membrane located in the vessel for closing the aperture, the membrane having an inner side facing the inner space of the vessel, an opposite outer side facing the bottom, and a circumferential side extended between the inner and outer sides, the membrane being retained between the step and the deformed area of the wall, with the step engaging the outer side of the membrane and the deformed area engaging the inner side of the membrane.

2. The apparatus as claimed in claim 1, wherein the step and/or the deformed area extends/extend around the membrane.

3. The apparatus as claimed in claim 1, wherein the step forms part of a bottom which has a grate-like region-including apertures therein.

4. The apparatus as claimed in claim 1, wherein the membrane is circular.

5. The apparatus as claimed in claim 1, wherein the membrane is a fibre glass membrane, plastic membrane, metallic lattice membrane, ceramic membrane or cellulose membrane.

6. The apparatus as claimed in claim 1, wherein the membrane is a multilayered membrane.

7. The apparatus as claimed in claim 1, wherein the vessel is made of a plastic material.

8. The apparatus as claimed in claim 1, wherein the vessel is made of a thermoplastic material.

9. The apparatus as claimed in claim 1, wherein the deformation is a deformation by ultrasonic sound.

10. The apparatus as claimed in claim 1, which is a centrifugal filtration vessel, bacterial culture vessel, dialytical vessel or a membrane panel.

11. The apparatus as claimed in claim 1, wherein the vessel is cylindrical and has a filing aperture opposite at least one aperture in a bottom.

12. The apparatus as claimed in claim 1, wherein the vessel has a collar at its outside.

13. The apparatus as claimed in claim 1, wherein the vessel has a receptacle or a closing lid on a filling aperture.

14. The apparatus of claim 1, wherein the step forms part of the bottom.

* * * * *

UNITED STATES PATENT AND TRADEMARK OFFICE
CERTIFICATE OF CORRECTION

PATENT NO. : 7,658,982 B2  Page 1 of 1
APPLICATION NO. : 10/225881
DATED : February 9, 2010
INVENTOR(S) : Detlef Schwarzwald It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 644 days.

Signed and Sealed this

Twenty-eighth Day of December, 2010

David J. Kappos
*Director of the United States Patent and Trademark Office*